United States Patent
Akihama et al.

(10) Patent No.: US 10,557,016 B2
(45) Date of Patent: Feb. 11, 2020

(54) FLAME RETARDANT RESIN COMPOSITION AND METHOD FOR PRODUCING THE SAME

(71) Applicants: Toyota Shatai Kabushiki Kaisha, Kariya-shi, Aichi (JP); KURASHIKI BOSEKI KABUSHIKI KAISHA, Kurashiki-shi, Okayama (JP)

(72) Inventors: Asuka Akihama, Aichi (JP); Minoru Sugiyama, Osaka (JP)

(73) Assignees: Toyota Shatai Kabushiki Kaisha, Aichi (JP); Kurashiki Boseki Kabushiki Kaisha, Okayama (JP)

(*) Notice: Subject to any disclaimer, the term of this patent is extended or adjusted under 35 U.S.C. 154(b) by 92 days.

(21) Appl. No.: 15/716,083

(22) Filed: Sep. 26, 2017

(65) Prior Publication Data

US 2018/0094116 A1    Apr. 5, 2018

(30) Foreign Application Priority Data

Sep. 30, 2016 (JP) .................. 2016-193772

(51) Int. Cl.
*C08K 5/00* (2006.01)
*D06M 14/22* (2006.01)
(Continued)

(52) U.S. Cl.
CPC ........... *C08K 5/0066* (2013.01); *D06M 14/22* (2013.01); *D06M 15/3564* (2013.01);
(Continued)

(58) Field of Classification Search
CPC ...... C08K 5/0066; C08K 5/5205; C08K 7/02; D06M 14/22; D06M 15/3564; D06M 15/61
See application file for complete search history.

(56) References Cited

U.S. PATENT DOCUMENTS

| | | | | |
|---|---|---|---|---|
| 4,086,385 A | * | 4/1978 | Rowland | C09D 5/18 252/608 |
| 2010/0261862 A1 | | 10/2010 | Sugiyama et al. | |
| 2016/0068663 A1 | * | 3/2016 | Sakurai | C08L 101/00 524/127 |

FOREIGN PATENT DOCUMENTS

| | | | | |
|---|---|---|---|---|
| DE | 10214654 A1 | * | 10/2003 | B29B 7/90 |
| DE | 102009004970 A1 | * | 7/2010 | B32B 7/12 |

(Continued)

OTHER PUBLICATIONS

Machine translation of DE 10214654. (Year: 2003).*

(Continued)

*Primary Examiner* — John E Uselding
(74) *Attorney, Agent, or Firm* — Hamre, Schumann, Mueller & Larson, P.C.

(57) ABSTRACT

A flame retardant resin composition includes a thermoplastic resin, flame retardant reinforced fibers, and a flame retardant. The flame retardant reinforced fibers include cellulosic fibers, a phosphorus compound that is grafted to the surface of the cellulosic fibers, and a polyamine compound that is bound to the phosphorus compound. The flame retardant is a phosphorus-based flame retardant. A method for producing the flame retardant resin composition includes the following: grafting a vinyl phosphate compound to cellulosic fibers by bringing the vinyl phosphate compound into contact with the cellulosic fibers after the cellulosic fibers have been irradiated with an electron beam, optionally followed by electron beam irradiation; binding a polyamine compound to the vinyl phosphate compound, which is grafted to the cellulosic fibers, to form flame retardant reinforced fibers; grinding the flame retardant reinforced fibers; and melt-kneading and pelletizing a thermoplastic resin, the flame retardant reinforced fibers, and a component containing a phosphorus- (Continued)

based flame retardant. This can provide a non-halogen flame retardant resin composition with sufficient flame resistance.

12 Claims, 1 Drawing Sheet

(51) Int. Cl.
  *D06M 15/356* (2006.01)
  *D06M 15/61* (2006.01)
  *D06M 101/06* (2006.01)

(52) U.S. Cl.
  CPC ......... *D06M 15/61* (2013.01); *C08L 2201/02* (2013.01); *D06M 2101/06* (2013.01); *D06M 2200/30* (2013.01)

(56) References Cited

FOREIGN PATENT DOCUMENTS

| EP | 2194185 A1 * | 6/2010 | ............. C09K 21/14 |
|---|---|---|---|
| GB | 1 455 783 | 11/1976 | |
| JP | 2007-130868 | 5/2007 | |
| JP | 2011-093185 | 5/2011 | |
| JP | 2012-012734 | 1/2012 | |
| JP | 5396283 | 1/2014 | |
| WO | 2009/096444 | 8/2009 | |

OTHER PUBLICATIONS

Machine translation of DE 102009004970. (Year: 2010).*
Sonnier, et al., "Improving the flame retardancy of flax fabrics by radiation grafting of phosphorus compounds", European Polymer Journal, vol. 68, May 9, 2015, pp. 313-325.
Bocz, et al., "Flax fibre reinforced PLA/TPS biocomposites flame retarded with multifunctional additive system", Polymer Degradation and Stability, vol. 106, Nov. 7, 2013, pp. 63-73.
Kozlowski, et al., "Flammability and fire resistance of composites reinforced by natural fibers", Polymers for Advanced Technologies, vol. 19, No. 6, Apr. 28, 2008, pp. 446-453.
Extended European Search Report issued in corresponding European Patent Application No. 17193427.6, dated Feb. 9, 2018, 6 pages.

* cited by examiner

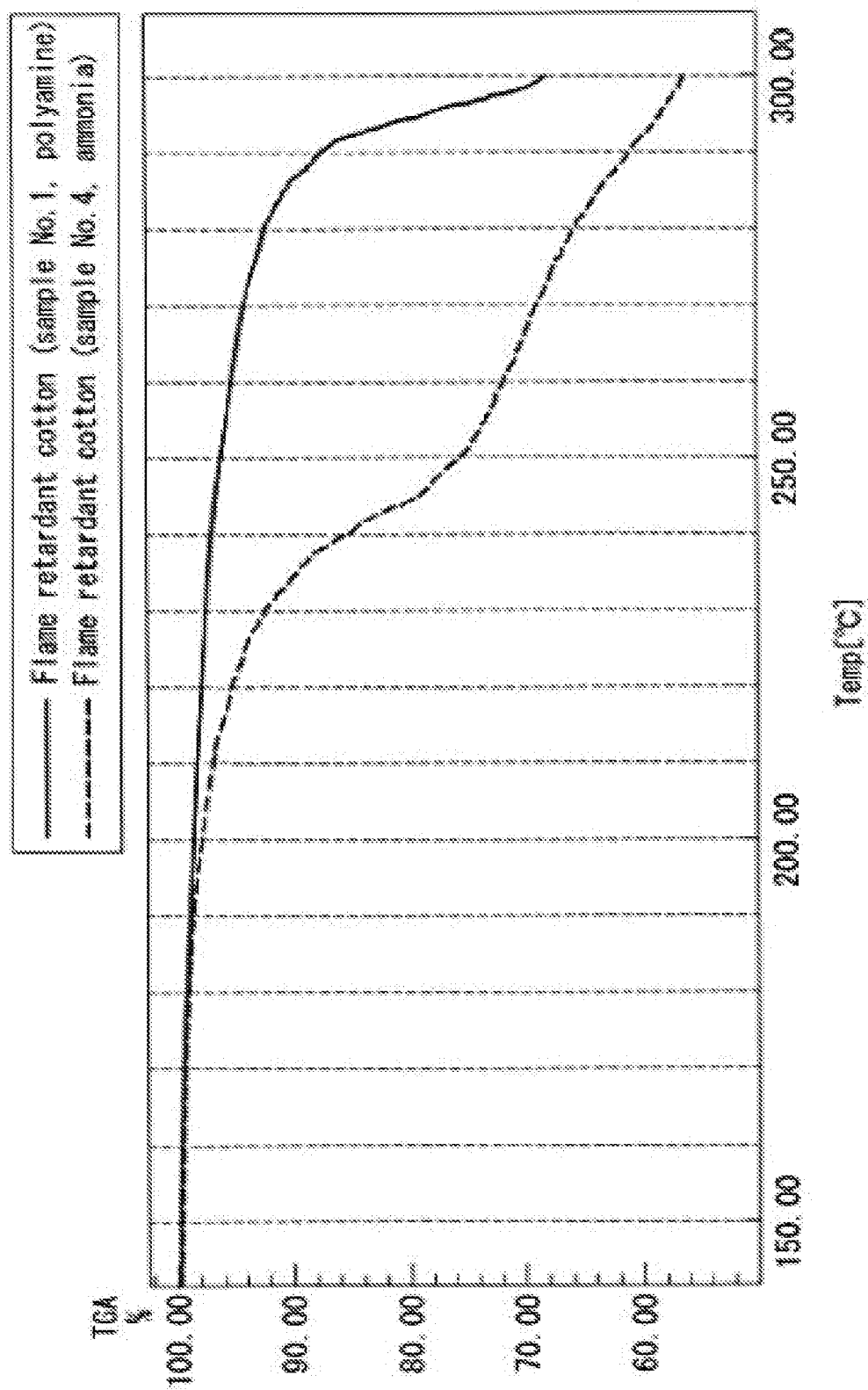

ically bonded to the cellulosic fibers, and the flame retardant is a phosphorus-based flame retardant. Therefore, the present invention can provide a non-halogen flame retardant resin composition with sufficient flame resistance, and a method for producing the same. Moreover, the cellulosic fibers themselves are made flame retardant. This can reduce the amount of the phosphorus-based flame retardant to be added, and thus can lead to a cost reduction. Further, if only phosphorus is covalently bonded to the cellulosic fibers, the heat resistance will be reduced. However, in addition to the phosphorus, polyamine is also bonded to the cellulosic fibers, thereby maintaining the heat resistance at a high temperature and broadening the choice of thermoplastic resins to be kneaded.

FLAME RETARDANT RESIN COMPOSITION AND METHOD FOR PRODUCING THE SAME

BACKGROUND OF THE INVENTION

1. Field of the Invention

The present invention relates to a non-halogen flame retardant resin composition with high flame resistance and a method for producing the same.

2. Description of Related Art

Conventionally, a molding compound formed by blending a resin material with reinforcing fibers such as vegetable fibers has been widely known. This fiber reinforced resin has advantages of light weight and high stiffness. However, when the conventional fiber reinforced resin is burned, some fibers serve as a conductor and may cause burning of the resin around the fibers. This is called a "candle effect", which is known to promote the burning. In order to prevent the "candle effect" and improve the flame resistance, Patent Document 1 proposes a method in which vegetable fibers are made flame retardant by including a boric acid or a boric acid compound, and the flame retardant vegetable fibers, a matrix resin, and a metal oxide are kneaded and then injection molded. Patent Document 2 proposes a method in which a resin (e.g., a polylactic resin), a flame retardant, and fibers that cover the flame retardant and are formed into pellets of 3 to 10 mm are mixed and then injection molded.

PRIOR ART DOCUMENTS

Patent Documents

Patent Document 1: JP 2007-130868
Patent Document 2: JP 2011-093185

SUMMARY OF THE INVENTION

However, the flame resistance is still insufficient in the flame retardant processing of the conventional technology. In particular, there has been a strong demand for the development of flame retardant processing that can achieve sufficient flame resistance without using a halogen flame retardant.

To solve the above conventional problem, the present invention provides a non-halogen flame retardant resin composition with sufficient flame resistance, and a method for producing the same.

A flame retardant resin composition of the present invention includes a thermoplastic resin, flame retardant reinforced fibers, and a flame retardant. The flame retardant reinforced fibers include cellulosic fibers, a phosphorus compound that is grafted to the surface of the cellulosic fibers, and a polyamine compound that is bound to the phosphorus compound. The flame retardant is a phosphorus-based flame retardant.

A method for producing a flame retardant resin composition of the present invention is a method for producing the flame retardant resin composition including a thermoplastic resin, flame retardant reinforced fibers, and a flame retardant. The method includes the following steps of: grafting a vinyl phosphate compound to cellulosic fibers by bringing the vinyl phosphate compound into contact with the cellulosic fibers after the cellulosic fibers have been irradiated with an electron beam, and/or by irradiating the cellulosic fibers that have been in contact with the vinyl phosphate compound with an electron beam; binding a polyamine compound to the vinyl phosphate compound, which is grafted to the cellulosic fibers, to form flame retardant reinforced fibers; grinding the flame retardant reinforced fibers; and melt-kneading and pelletizing the thermoplastic resin, the flame retardant reinforced fibers, and a component containing a phosphorus-based flame retardant.

In the flame retardant resin composition of the present invention, the flame retardant reinforced fibers are formed by bonding phosphorus and polyamine to the surface of the cellulosic fibers, and the flame retardant is a phosphorus-based flame retardant. Therefore, the present invention can provide a non-halogen flame retardant resin composition with sufficient flame resistance, and a method for producing the same. Moreover, the cellulosic fibers themselves are made flame retardant. This can reduce the amount of the phosphorus-based flame retardant to be added, and thus can lead to a cost reduction. Further, if only phosphorus is covalently bonded to the cellulosic fibers, the heat resistance will be reduced. However, in addition to the phosphorus, polyamine is also bonded to the cellulosic fibers, thereby maintaining the heat resistance at a high temperature and broadening the choice of thermoplastic resins to be kneaded.

BRIEF DESCRIPTION OF THE DRAWINGS

The FIGURE is a graph showing the results of thermogravimetric analysis (TGA) in an example of the present invention and a comparative example.

DETAILED DESCRIPTION OF THE INVENTION

A flame retardant resin composition of the present invention includes a thermoplastic resin, flame retardant reinforced fibers, and a flame retardant. Any thermoplastic resin may be used. Examples of the thermoplastic resin include the following: polyolefin resins such as polyethylene and polypropylene; polystyrene resin; acrylic resins such as polymethacrylate; polyamide resins such as nylon 6 and nylon 66; polyester resins such as polybutylene terephthalate and polyethylene terephthalate; ABS resin; vinyl chloride resin; polycarbonate resin; polyacetal resin; and various types of thermoplastic elastomers. Among them, the polyolefin resins and the polyester resins are preferred.

In the present invention, the flame retardant reinforced fibers are formed by bonding phosphorus and polyamine to the surface of the cellulosic fibers. Examples of the cellulosic fibers include regenerated fibers such as rayon, cupra, and lyocell in addition to natural fibers such as cotton, hemp (including flax, ramie, jute, kenaf cannabis, Manila hemp, sisal, and New Zealand flax), kapok, banana, and palm. These cellulosic fibers are bonded with phosphorus and polyamine to form the flame retardant reinforced fibers.

The flame retardant used in the present invention may be a non-halogen phosphorus-based flame retardant. Such a non-halogen type flame retardant is less likely to emit toxic fumes and ensures the environmental safety. The flame retardant resin composition of the present invention has sufficient flame resistance.

It is preferable that a phosphorous content in the flame retardant resin composition is 1.0 to 5.0% by mass with respect to 100% by mass of the flame retardant resin composition. Although the phosphorus content is low, the flame retardant effect is improved.

It is preferable that a polyamine compound content in the flame retardant resin composition is 1 to 5% by mass with respect to 100% by mass of the flame retardant resin composition. An ionic bond is formed between the polyamine compound and the phosphorus compound that is graft-polymerized onto the surface of the cellulosic fibers. If only the phosphorus compound is graft-polymerized (covalently bonded) to the cellulosic fibers, the heat resistance will be reduced to about 150° C. However, the ionic bond between the polyamine compound and the phosphorus compound can maintain the heat resistance at 220° C. or higher, and also can broaden the choice of thermoplastic resins to be kneaded.

It is preferable that a content of the phosphorus-based flame retardant is 1 to 20% by mass with respect to 100% by mass of the flame retardant resin composition. This can improve the flame resistance.

A method for producing a flame retardant resin composition of the present invention includes the following steps of covalently bonding a vinyl phosphate compound to cellulosic fibers by bringing the vinyl phosphate compound into contact with the cellulosic fibers after the cellulosic fibers have been irradiated with an electron beam, and/or by irradiating the cellulosic fibers that have been in contact with the vinyl phosphate compound with an electron beam; binding a polyamine compound to the vinyl phosphate compound to form flame retardant reinforced fibers; grinding the flame retardant reinforced fibers; and melt-kneading and pelletizing the thermoplastic resin, the flame retardant reinforced fibers, and a component containing a phosphorus-based flame retardant.

It is preferable that the vinyl phosphate compound is mono(2-acryloyloxyethyl) phosphate. This compound is easily grafted to the surface of the cellulosic fibers.

An amine compound may be a primary amine, a secondary amine, or a tertiary amine, and any of these amines can be polymerized to form the polyamine compound. The polyamine compound formed by the polymerization of primary amines may be, e.g., polyallylamine. The polyamine compound formed by the polymerization of secondary amines may be, e.g., polyethyleneimine. Moreover, the polyamine compound that is a condensation product of secondary amines and has structures of secondary and tertiary amines may be, e.g., dicyandiamide. Further, examples of the polyamine compound include dicyandiamide-formalin condensate and dicyandiamide-alkylene (polyamine) condensate. In terms of heat resistance, polyallylamine with a molecular weight of about 500 to 5000 is preferred. The amount of polyamine adhering to the flame retardant cellulosic fibers of the present invention is preferably 5 to 20% by mass with respect to 100% by mass of the cellulosic fibers to which polyamine has adhered. Moreover, a crosslinking agent may be added after the ionic bond is formed between the polyamine compound and the phosphorus compound in order to improve the durability further.

Hereinafter, a method for producing flame retardant cellulosic fibers of the present invention will be described. The method mainly includes a phosphorus treatment process in which the phosphorus compound is grafted, and a polyamine treatment process in which the polyamine compound is reacted.

(1) Phosphorus Treatment Process

In the phosphorus treatment process, (i) the cellulosic fibers are irradiated with an electron beam, and then brought into contact with a vinyl phosphate compound, or (ii) the cellulosic fibers are brought into contact with a vinyl phosphate compound, and then irradiated with an electron beam, or (iii) the cellulosic fibers are irradiated with an electron beam, then brought into contact with a vinyl phosphate compound, and further irradiated with an electron beam again. In the present invention, the phosphorus treatment process is also referred to as "EB" or "EB processing". The EB processing is performed to graft phosphoric acid ester monomers to the cellulosic fibers. In other words, the EB processing allows the vinyl phosphate compound to be covalently bonded to the cellulosic fibers. Thus, the electron beam irradiation initiates radical polymerization of the vinyl phosphate compound and the cellulosic fibers. The vinyl phosphate compound may be any compound that contains a phosphorus atom and has a structure containing a radically polymerizable group. Examples of the vinyl phosphate compound include unsaturated organophosphate and methacrylic acid ester. For example, a vinyl phosphate compound expressed by the following general formula (1) (referred to as a "vinyl phosphate compound (1)" in the following) is preferably used.

[Chemical Formula 1]

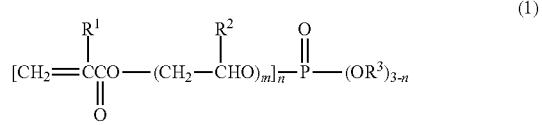

(1)

In the general formula (1), $R^1$ and $R^2$ each independently represent a hydrogen atom or a methyl group, and preferably $R^1$ is a methyl group and $R^2$ is a hydrogen atom. $R^3$ represents a hydrogen atom, an alkyl group having 1 to 6 carbon atoms, or an aryl group that may have a substituent, and preferably $R^3$ is a hydrogen atom. Moreover, n is 1 or 2, and m is an integer of 1 to 6, preferably is an integer of 1 to 3, and more preferably is 1. In this case, the aryl group is preferably a phenyl group or a naphthyl group.

Preferred examples of the vinyl phosphate compound (1) include the following: mono(2-acryloyloxyethyl) phosphate; mono(2-methacryloyloxyethyl) phosphate; bis(2-acryloyloxyethyl) phosphate; bis(2-methacryloyloxyethyl) phosphate; diethyl-(2-acryloyloxyethyl) phosphate; diethyl-(2-methacryloyloxyethyl) phosphate; diphenyl-(2-acryloyloxyethyl) phosphate; diphenyl-(2-methacryloyloxyethyl) phosphate; polyalkylene glycol (2-acryloyloxyethyl) phosphate; and polyalkylene glycol (2-methacryloyloxyethyl) phosphate. These vinyl phosphate compounds are commercially available. For example, mono(2-methacryloyloxyethyl) phosphate and bis(2-methacryoyloxyethyl) phosphate are available from Sigma-Aldrich Japan and Kyoeisha Chemical Co., Ltd. For example, a mixture of mono(2-methacryloyloxyethyl) phosphate and bis(2-methacryloyloxyethyl) phosphate is available as "ALBRITECT (registered trademark) 6835" (manufactured by Solvay Nicca, Ltd.). For example, mono(2-methacryloyloxyethyl) phosphate is available as "Phosmer M" (manufactured by Uni-Chemical Co., Ltd.). For example, polyalkylene glycol (2-acryloyloxyethyl) phosphate is available as "SIPOMER PAM-100" (manufactured by Solvay Nicca, Ltd.). For example, polyethylene glycol (2-methacryloyloxyethyl) phosphate is available as "Phosmer PE" (manufactured by Uni-Chemical Co., Ltd.).

The amount of irradiation of the electron beam is generally 1 to 200 kGy, preferably 5 to 100 kGy, and more preferably 10 to 50 kGy. It is preferable that the electron beam irradiation is performed in a nitrogen atmosphere.

Because of the penetrability of the electron beam, only one side of the cellulosic fibers needs to be irradiated with the electron beam. The electron beam irradiation apparatus can be any commercially available apparatus, including, e.g., an area beam type electron beam irradiation apparatus such as EC250/15/180L (manufactured by IWASAKI ELECTRIC CO., LTD.), EC300/165/800 (manufactured by IWASAKI ELECTRIC CO., LTD.), or EPS300 (manufactured by NHV Corporation).

After the electron beam irradiation, the cellulosic fibers are generally washed with water to remove unreacted components and dried. The drying may be achieved by, e.g., keeping the cellulosic fibers at 20 to 85° C. for 0.5 to 24 hours.

In the present invention, it is preferable that the cellulosic fibers are irradiated with an electron beam beforehand and then come into contact with the vinyl phosphate compound, as described above. Moreover, it is particularly preferable that the cellulosic fibers that have been in contact with the vinyl phosphate compound are irradiated with an electron beam again. This promotes the chemical bond between the cellulosic fibers and the vinyl phosphate compound, so that flame resistance can be exhibited more effectively. When the cellulosic fibers are treated with the vinyl phosphate compound by the above flame retardant processing, the vinyl phosphate compound can be bonded efficiently to the surface of the cellulosic fibers. The vinyl phosphate compound bonded to the cellulosic fibers can be detected by confirming the presence of a specific element contained in the vinyl phosphate compound using an apparatus for X-ray fluorescence analysis, e.g., a scanning X-ray fluorescence spectrometer ZSX 100e (manufactured by Rigaku Corporation). In this case, the specific element for the vinyl phosphate compound (1) or an additive-type phosphorus compound is phosphorus.

As a result of the above treatment, the following general formulas (A) and (B) show examples of the covalent bond between the cellulosic fibers and mono(2-methacryloyloxyethyl) phosphate (i.e., a radical polymerizable flame retardant). In the general formulas (A) and (B), n is an integer of 1 or more, and "Cell" represents cellulose.

[Chemical Formula 2]

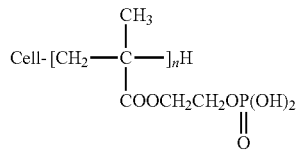

(A)

[Chemical Formula 3]

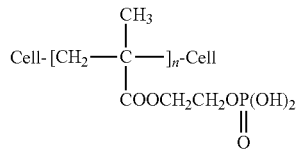

(B)

In the phosphorus treatment process, it is preferable that the cellulosic fibers are impregnated or padded with an aqueous solution of the vinyl phosphate compound. The content of the vinyl phosphate compound in the aqueous solution of the vinyl phosphate compound is preferably 5 to 50% by mass, and more preferably 10 to 35% by mass in terms of flame resistance. The aqueous solution of the vinyl phosphate compound is not particularly limited, but has a pH of preferably 3.5 to 7.0, and more preferably 5.0 to 6.0 so as to maintain the tenacity of the cellulosic fibers. The pH of the aqueous solution can be adjusted with aqueous ammonia.

(2) Polyamine Treatment Process

In the polyamine treatment process, polyamine is reacted with the cellulosic fibers after the phosphorous treatment process. The polyamine treatment is intended to protect a phosphate group. Examples of polyamine include amino group containing polymers such as polyallylamine, polyethyleneimine, dicyandiamide-formalin condensate, and dicyandiamide-alkylene (polyamine) condensate. The polyamine treatment preferably uses an aqueous solution containing 0.5 to 20% by mass of polyamine. Polyallylamine may be, e.g., "PAA-03" (trade name) manufactured by Nitto Boseki Co., Ltd. The polyamine treatment preferably includes bringing the cellulosic fibers into contact with the aqueous solution of polyamine, e.g., impregnating or padding the cellulosic fibers with the aqueous solution of polyamine, followed by washing and drying. The following chemical formula 4 shows an example of the binding state of polyallylamine. In the chemical formula 4, n is an integer of 1 or more.

[Chemical Formula 4]

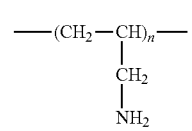

(3) Grinding Process

The flame retardant reinforced fibers (flame retardant cellulosic fibers) obtained in the above manner are then ground. The grinding may be performed so that the aggregated fibers are broken up, or the ground fibers have a fiber length suitable for an extrusion kneading process. The grinding may be minor in degree as long as these requirements are met. The average fiber length after the grinding process is preferably 1 to 25 mm, and more preferably 1 to 15 mm.

The flame retardant reinforced fibers (flame retardant cellulosic fibers) thus ground are mixed with a thermoplastic resin and a component containing a phosphorus-based flame retardant. Subsequently, the mixture is melt-kneaded and pelletized to form a flame retardant resin composition. The following chemical formula 5 shows an example of the phosphorus-based flame retardant for a resin. In the chemical formula 5, n is an integer of 1 or more.

[Chemical Formula 5]

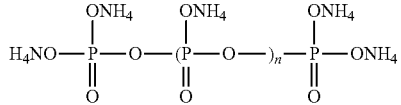

The pellets thus obtained are subjected to, e.g., injection molding, extrusion molding, or press molding in the usual manner.

EXAMPLES

The present invention will be described in more detail by way of examples. However, the present invention is not limited to the following examples.

<Evaluation Method>

(1) The amount (% by mass) of the vinyl phosphate compound covalently bonded to the cellulosic fibers in the phosphorus treatment process, i.e., the graft ratio (owf %) was calculated by the following formula, where "owf" is an abbreviation of on the weight of fiber.

Graft ratio (owf %)=[(the mass of cellulosic fibers after EB processing−the mass of cellulosic fibers before EB processing)/(the mass of cellulosic fibers before EB processing)]×100

(2) The amount (owf %) of polyamine adhering to the vinyl phosphate compound in the polyamine treatment process was calculated by the following formula.

Amount of polyamine adhered (owf %)=[(the mass of cellulosic fibers after polyamine treatment−the mass of cellulosic fibers before polyamine treatment)/(the mass of cellulosic fibers before polyamine treatment)]×100

(3) Flame Resistance

The flame resistance was evaluated based on the criteria of a burning time, the presence or absence of dripping, and self extinguishing in accordance with the UL-94 standard, as shown in Table 1.

The UL-94 measurement was performed in the following manner. Samples were held in the vertical position, and the flame of a gas burner was applied to the lower edge of each of the samples for 10 seconds and removed. If burning stopped within 30 seconds, then the flame of the gas burner was reapplied for another 10 seconds. All the following conditions should be met to achieve the V-0 rating: (i) none of the samples continue to burn for 10 seconds or more after either flame application; (ii) the total burning time for 10 flame applications for each set of 5 samples does not exceed 50 seconds; (iii) none of the samples burn up to the holding clamp; (iv) none of the samples drip flaming particles that ignite dry absorbent cotton located below the sample; and (v) none of the samples have glowing combustion that persists for 30 seconds or more after the second flame application.

TABLE 1

| | Evaluation of flame resistance | | |
|---|---|---|---|
| | A | B | C |
| Burning time | less than 10 seconds | 10 seconds or more | — |
| Presence or absence of dripping | absence of dripping | | presence of dripping |
| Self-extinguishing | self-extinguish | | not self-extinguish |

(4) Heat Resistance

Thermogravimetric analysis (TGA) was performed on the treated cellulosic fibers. The beat resistance was determined from the TGA graph. The heat-resistant temperature was defined as a temperature at which the mass of the cellulosic fibers was reduced by 3%.

(Flame Retardant Cellulosic Fibers: Sample No. 1 and Sample No. 2)

<Cellulosic Fibers>

Cotton with an average fiber length of 38 mm was used as cellulosic fibers.

<Agents Used>

(1) Agent Used for Electron Beam (EB) Processing (Also Referred to Simply as an "EB Agent" in the Following)

A 15% aqueous solution of mono(2-methacryloyloxy-ethyl) phosphate ("LIGHT ESTER P-1M" (trade name) manufactured by Kyoeisha Chemical Co., Ltd., abbreviated as "P1M" in the following) was used.

(2) Agent Used for Polyamine Treatment

An aqueous solution containing 10% by mass of polyallylamine ("PAA-03" (trade name) manufactured by Nitto Boseki Co., Ltd., molecular weight: 3000) was used.

<Treatment Method>

In the treatment method, the phosphorus treatment process and the polyamine treatment process were performed in this order.

(1) Phosphorus Treatment Process (Electron Beam Irradiation)

One side of the cellulosic fibers was irradiated with an electron beam of 40 kGy in a nitrogen atmosphere by the area beam type electron beam irradiation apparatus EC250115/180L (manufactured by IWASAKI ELECTRIC CO., LTD.). The acceleration voltage was 250 kV.

(Electron Beam Processing)

The cellulosic fibers were irradiated with an electron beam, and then brought into contact with a vinyl phosphate compound (which is called "pre-irradiation"). After the electron beam irradiation, the cellulosic fibers (cotton fibers) were impregnated with the aqueous solution containing the P1M agent at room temperature, washed with water, and dried at 150° C. for 90 seconds.

(2) Polyamine Treatment Process

Next, the cellulosic fibers were brought into contact with the aqueous solution of polyallylamine under the conditions of 100° C., 1 hour, and a bath ratio of 14:1. The cellulosic fibers were then washed with water and dried at 150° C. for 180 seconds.

In the phosphorus treatment process, the cellulosic fibers that were impregnated with the P1M aqueous solution for 120 seconds were defined as a sample No. 1 of the flame retardant cellulosic fibers. Moreover, the cellulosic fibers that were impregnated with the P1M aqueous solution for 360 seconds were defined as a sample No. 2 of the flame retardant cellulosic fibers. Table 2 shows the rate of change in weight of the fibers and the heat resistance of each sample.

(Flame Retardant Cellulosic Fibers: Sample No. 3)

Flame retardant cellulosic fibers were produced by general phosphorylation instead of grafting. The same cellulosic fibers as those of the sample No. 1 were impregnated with a treatment liquid containing 10% by mass of phosphorous acid (manufactured by Sigma-Aldrich Japan), 30% by mass of urea (manufactured by Nacalai Tesque, Inc.), and 60% of water, and then squeezed by a mangle. The resulting cellulosic fibers were preliminary dried at 150° C. for 180 seconds, and subsequently heat treated at 165° C. for 105 seconds. After the heat treatment, the cellulosic fibers were washed with water and dried, which were defined as a sample No. 3 of the flame retardant cellulosic fibers. Table 2 shows the rate of change in weight of the fibers and the heat resistance of this sample.

(Flame Retardant Cellulosic Fibers: Sample No. 4)

Flame retardant cellulosic fibers were produced by a so-called padding process alone, rather than by bonding a phosphorus compound to the cellulosic fibers. The same cellulosic fibers as those of the sample No. 1 were impregnated with a treatment liquid containing 20% by mass of phosphoric acid (manufactured by Nacalai Tesque, Inc., a product of 85% by mass), 24% by mass of aqueous ammonia (manufactured by Nacalai Tesque, Inc., a product of 28% by mass), and 56% of water, and then squeezed by a mangle. The resulting cellulosic fibers were dried by heat treatment at 150° C. for 180 seconds. During the drying process, the cellulosic fibers were carbonized due to lack of heat resistance. Therefore, the flame retardant cellulosic fibers could not be used for a blending test with a resin.

(Flame Retardant Cellulosic Fibers: Sample No. 5)

The same cellulosic fibers as those of the sample No. 1 were used and did not undergo any treatment. Thus, untreated cellulosic fibers were obtained.

Examples 1 to 3, Comparative Examples 1 to 4

Each sample of the flame retardant cellulosic fibers was ground so that the fibers had an average fiber length of 10 mm. Then, the flame retardant cellulosic fibers thus ground, a polypropylene (PP) resin, and the phosphorus-based flame retardant for a resin (represented by the chemical formula 5) were mixed at a mixing ratio shown in Table 3. The mixture was melt-kneaded by an extruder to form pellets. The melt-kneading temperature was 200° C. The pellets were subjected to injection molding, resulting in molded articles with a length of 80 mm, a width of 10 mm, and a thickness of 4 mm. Table 3 shows the results.

covalent bond between the cellulosic fibers and the phosphorus compound and the ionic bond between the polyamine compound and the phosphorus compound.

Tables 2 and 3 show that the examples of the present invention have a shorter burning time and higher flame resistance of V-0 in accordance with the UL-94 standard, as compared to the comparative examples. In addition, the examples of the present invention can achieve sufficient flame resistance without using a halogen flame retardant. Since the cellulosic fibers themselves are made flame retardant, the amount of the phosphorus-based flame retardant to be added can be reduced, which suppresses a decrease in mechanical performance due to the phosphorus-based flame retardant. Therefore, the examples of the present invention can effectively exhibit the reinforcing effect of the cellulosic fibers. This also leads to a cost reduction. Moreover, there is no need to add a drip inhibitor such as polytetrafluoroethylene (PTFE) particles. On the other hand, the conventional examples have the disadvantage of reducing the mechanical

TABLE 2

| Flame retardant cellulosic fiber | | Flame retardant processing | Agent | | Change in weight (owf %) | | Heat resistance (from TGA) (° C.) | Note |
|---|---|---|---|---|---|---|---|---|
| | | | Type | Concentration (wt %) | After introduction of phosphorus | After introduction of polyamine | | |
| Sample No. (Example) | 1 | EB grafting | P1M → polyamine | 15 (polymerization time: 120 seconds) | 56 | 3 | 220-230 | The polyamine treatment was performed after the phosphorus treatment. |
| | 2 | EB grafting | P1M → polyamine | 15 (polymerization time: 360 seconds) | 110 | 37 | 220-230 | |
| Sample No. (Comparative Example) | 3 | phosphorylation | phosphorous acid + urea → polyamine | 10 + 30 | 8 | 12 | 220-230 | |
| | 4 | padding/drying | phosphoric acid + ammonia | 20 + 24 | 19 | — | 180-190 | Only the padding process was performed. |
| | 5 | untreated | — | — | — | — | 230-240 | untreated cotton |

TABLE 3

| | | Example 1 | Example 2 | Example 3 | Comparative Example 1 | Comparative Example 2 | Comparative Example 3 | Comparative Example 4 |
|---|---|---|---|---|---|---|---|---|
| Sample No. of flame retardant cellulosic fiber | | 1 | 2 | 2 | 3 | 5 | — | — |
| Mixing ratio of PP resin (% by mass) | | 70 | 70 | 70 | 70 | 49 | 70 | 100 |
| Mixing ratio of cellulosic fiber (% by mass) | | 15 | 15 | 20 | 15 | 21 | 0 | 0 |
| Mixing ratio of phosphorus-based flame retardant (% by mass) | | 15 | 15 | 10 | 15 | 30 | 30 | 0 |
| Phosphorus content (% by mass) | | 1.5 | 2.1 | 2.1 | 1.9 | 2.2 | 2.2 | 0 |
| Flame resistance | Burning time (sec) | 3 | 1 | 1 | 20 or more | 40 or more | 0 | not self-extinguish |
| | Presence or absence of dripping | No | No | No | No | No | No | Yes |
| | Flame retardant evaluation | A | A | A | B | B | A | C |
| Tensile test | Modulus of elasticity (MPa) | 2893 | 2863 | 2861 | 3129 | 3565 | 2260 | 1960 |
| | Strength (MPa) | 33.7 | 34.9 | 37.3 | 40.1 | 32.0 | 24.9 | 42.2 |

The FIGURE is a graph showing the results of thermogravimetric analysis (TGA) in an example of the present invention (i.e., the sample obtained by the phosphorus treatment process and the polyamine treatment process) and a comparative example (i.e., the sample obtained by the padding process without the polyamine treatment process). As is evident from the FIGURE, it is possible to maintain the heat resistance at a high temperature because of both the properties due to a large amount of the phosphorus-based flame retardant added. However, the examples of the present invention can suppress a decrease in physical properties by reducing the amount of the additives, and also can improve the physical properties because of the reinforcing effect of the cellulosic fibers.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A flame retardant resin composition comprising:
a thermoplastic resin;
flame retardant reinforced fibers dispersed in the thermoplastic resin; and
a flame retardant,
wherein the flame retardant reinforced fibers include cellulosic fibers, a phosphorus compound that is grafted to a surface of the cellulosic fibers, and a polyamine compound that is bound to the phosphorous compound,
the flame retardant reinforced fibers have an average fiber length of 1 to 25 mm, and
the flame retardant is a phosphorus-based flame retardant, and
the flame retardant resin composition has flame resistance of V-0 or higher in accordance with the UL-94 standard without the presence of a drip inhibitor.

2. The flame retardant resin composition according to claim 1, wherein the flame retardant resin composition does not contain a halogen-based flame retardant.

3. The flame retardant resin composition according to claim 1, wherein a phosphorous content in the flame retardant resin composition is 1.0 to 5.0% by mass with respect to 100% by mass of the flame retardant resin composition.

4. The flame retardant resin composition according to claim 1, wherein an ionic bond is formed between the polyamine compound and the phosphorus compound that is grafted to the surface of the cellulosic fibers in the flame retardant reinforced fibers.

5. The flame retardant resin composition according to claim 1, wherein a content of the phosphorus-based flame retardant is 1 to 20% by mass with respect to 100% by mass of the flame retardant resin composition.

6. A method for producing a flame retardant resin composition comprising a thermoplastic resin, flame retardant reinforced fibers dispersed in the thermoplastic resin, and a flame retardant,
the method comprising:
grafting a vinyl phosphate compound to cellulosic fibers by bringing the vinyl phosphate compound into contact with the cellulosic fibers after the cellulosic fibers have been irradiated with an electron beam, and/or irradiating the cellulosic fibers that have been in contact with the vinyl phosphate compound with an electron beam;
binding a polyamine compound to the vinyl phosphate compound, grafted to the cellulosic fibers, to form flame retardant reinforced fibers;
grinding the flame retardant reinforced fibers so that the flame retardant reinforced fibers have an average fiber length of 1 to 25 mm; and
melt-kneading and pelletizing the thermoplastic resin, the flame retardant reinforced fibers, and a component containing a phosphorus-based flame retardant,
wherein the flame retardant resin composition has flame resistance of V-0 or higher in accordance with the UL-94 standard without the presence of a drip inhibitor.

7. The method according to claim 6, wherein the vinyl phosphate compound is mono(2-acryloyloxyethyl) phosphate.

8. The method according to claim 6, wherein the polyamine compound is polyallylamine.

9. The method according to claim 6, wherein the flame retardant resin composition does not contain a halogen-based flame retardant.

10. The method according to claim 6, wherein a phosphorous content in the flame retardant resin composition is 1.0 to 5.0% by mass with respect to 100% by mass of the flame retardant resin composition.

11. The method according to claim 6, wherein an ionic bond is formed between the polyamine compound and the phosphorus compound that is grafted to the cellulosic fibers in the flame retardant reinforced fibers.

12. The method according to claim 6, wherein a content of the phosphorus-based flame retardant is 1 to 20% by mass with respect to 100% by mass of the flame retardant resin composition.

* * * * *